US012667849B2

(12) United States Patent
Osman et al.

(10) Patent No.: US 12,667,849 B2
(45) Date of Patent: Jun. 30, 2026

(54) CENTRIFUGAL SEPARATOR FOR SEPARATING A LIQUID MIXTURE WITH POSITIVE DISPLACEMENT PUMPS RESPECTIVELY DOWNSTREAM OF OUTLETS

(71) Applicant: Alfa Laval Corporate AB, Lund (SE)

(72) Inventors: Douglas Osman, Newtown SQ, PA (US); Per-Gustaf Larsson, Huddinge (SE); Peter Thorwid, Sundbyberg (SE); Staffan Königsson, Tumba (SE)

(73) Assignee: ALFA LAVAL CORPORATE AB, Lund (SE)

( * ) Notice: Subject to any disclaimer, the term of this patent is extended or adjusted under 35 U.S.C. 154(b) by 876 days.

(21) Appl. No.: 17/796,767

(22) PCT Filed: Feb. 11, 2021

(86) PCT No.: PCT/EP2021/053327
§ 371 (c)(1),
(2) Date: Aug. 1, 2022

(87) PCT Pub. No.: WO2021/165137
PCT Pub. Date: Aug. 26, 2021

(65) Prior Publication Data

US 2023/0070550 A1 Mar. 9, 2023

Related U.S. Application Data

(60) Provisional application No. 62/978,142, filed on Feb. 18, 2020.

(30) Foreign Application Priority Data

Feb. 25, 2020 (EP) .................................... 20159355

(51) Int. Cl.
*B04B 1/08* (2006.01)
*B04B 11/02* (2006.01)

(52) U.S. Cl.
CPC ................ *B04B 1/08* (2013.01); *B04B 11/02* (2013.01)

(58) Field of Classification Search
CPC ................................. B04B 1/08; B04B 11/02
(Continued)

(56) References Cited

U.S. PATENT DOCUMENTS 3,750,940 A * 8/1973 Nilsson .................. B04B 13/00 494/35
6,027,657 A 2/2000 Min et al.
(Continued)

FOREIGN PATENT DOCUMENTS

CA 875960 A 7/1971
CN 1281815 A 8/2000
(Continued)

OTHER PUBLICATIONS

International Search Report, issued in PCT/EP2021/053327, dated May 3, 2021.
(Continued)

*Primary Examiner* — Claire X Wang
*Assistant Examiner* — Shuyi S. Liu
(74) *Attorney, Agent, or Firm* — Birch, Stewart, Kolasch & Birch, LLP

(57) ABSTRACT

A centrifugal separator for separation of a liquid mixture includes a stationary frame, a rotatable assembly and a drive unit for rotating the rotatable assembly relative the frame around an axis of rotation, wherein the rotatable assembly includes a rotor casing enclosing a separation space in which a stack of separation discs is arranged to rotate around a vertical axis of rotation. The rotor casing includes a
(Continued)

mechanically hermetically sealed inlet for supply of the liquid mixture to the separation space; a first liquid outlet that is mechanically hermetically sealed and arranged for discharge of a separated liquid phase and a second liquid outlet that is mechanically hermetically sealed and arranged for discharge of a separated heavy phase, the heavy phase having a density that is higher than said liquid phase. The separator further includes at least one positive displacement pump arranged downstream of the second liquid outlet for transporting the separated heavy phase from the separation space and at least one positive displacement pump arranged downstream of the first liquid outlet for transporting the separated liquid phase from the separation space.

18 Claims, 5 Drawing Sheets

(58) Field of Classification Search
USPC ........ 417/30, 31, 476, 477.1, 477.6; 494/42, 494/67, 70
See application file for complete search history.

(56) References Cited

U.S. PATENT DOCUMENTS

| | | | | |
|---|---|---|---|---|
| 9,186,687 | B2 * | 11/2015 | Häggmark | B04B 11/02 |
| 2017/0203306 | A1 * | 7/2017 | Penkl | B04B 11/02 |
| 2017/0333915 | A1 | 11/2017 | Mackel et al. | |
| 2019/0283045 | A1 * | 9/2019 | Kessler | B04B 11/082 |

FOREIGN PATENT DOCUMENTS

| | | | | | |
|---|---|---|---|---|---|
| CN | 103464309 | A | | 12/2013 | |
| CN | 193587085 | A | | 2/2014 | |
| CN | 109382222 | A | | 2/2019 | |
| EP | 0 241 128 | A1 | | 10/1987 | |
| EP | 0346056 | A2 | * | 12/1989 | B04B 1/08 |
| EP | 0334898 | B1 | * | 4/1991 | F04B 43/1253 |
| EP | 2567754 | A1 | * | 3/2013 | B04B 1/00 |
| EP | 2949627 | A1 | * | 12/2015 | C02F 1/001 |
| GB | 1111557 | | | 5/1968 | |
| GB | 1111557 | A | * | 5/1968 | B04B 1/08 |
| GB | 992909300 | A | | 12/1999 | |
| JP | 03131360 | A | * | 6/1991 | |
| JP | 2017-537790 | A | | 12/2017 | |
| WO | WO 2011/093784 | A1 | | 8/2011 | |
| WO | WO 2015/181177 | A1 | | 12/2015 | |

OTHER PUBLICATIONS

Written Opinion of the International Searching Authority, issued in PCT/EP2021/053327, dated May 3, 2021.
Translation of Japanese Office Action dated Aug. 28, 2023 for Application No. 2022-549511.
Boyne, “West German Westphalia Centrifuge”, Food Science & Technology, No. 4, Jul. 20, 1982, pp. 18-19, with English translation.
English translation of the Chinese Offion Action for Chinese Application No. 202180015064.7, daled Mar. 27, 2023.

* cited by examiner

CENTRIFUGAL SEPARATOR FOR SEPARATING A LIQUID MIXTURE WITH POSITIVE DISPLACEMENT PUMPS RESPECTIVELY DOWNSTREAM OF OUTLETS

CROSS REFERENCE TO RELATED APPLICATIONS

This application is the National Phase of PCT International Application No. PCT/EP2021/053327, filed on Feb. 11, 2021, which claims priority under 35 U.S.C. 119(e) to U.S. Provisional Application No. 62/978,142, filed on Feb. 18, 2020 and under 35 U.S.C. 119(a) to patent application No. 20159355.5, filed in Europe on Feb. 25, 2020, all of which are hereby expressly incorporated by reference into the present application.

TECHNICAL FIELD

The present inventive concept relates to the field of centrifugal separators. More particularly it relates to controlling the flow through a centrifugal separator.

BACKGROUND

Centrifugal separators are generally used for separation of liquids and/or solids from a liquid mixture or a gas mixture. During operation, fluid mixture that is about to be separated is introduced into a rotating bowl and due to the centrifugal forces, heavy particles or denser liquid, such as water, accumulates at the periphery of the rotating bowl whereas less dense liquid accumulates closer to the central axis of rotation. This allows for collection of the separated fractions, e.g. by means of different outlets arranged at the periphery and close to the rotational axis, respectively.

WO 2015/181177 discloses a separator for the centrifugal processing of a pharmaceutical product, such as a fermentation broth. The separator comprises a rotatable outer drum and an exchangeable inner drum arranged in the outer drum. The inner drum comprises means for clarifying the flowable product. The outer drum is driven via drive spindle by a motor arranged below the outer drum. The inner drum extends vertically upwardly through the outer drum which fluid connections arranged at an upper end of the separator.

However, processing a cell culture mixture, such as a cell culture mixture from a fermentation broth, may lead to excessive breakage of the cells, since e.g. mammalian cells and CHO cells may be sensitive to the shear forces experienced with in the centrifugal field. It is also important to have an accurate flow control through the separator, such that separated liquid light phase, which may comprise the molecule being produced by the cell culture during fermentation, does not escape through the liquid heavy phase outlet.

There is thus a need in the art for centrifugal separators, such as separators for separating cell culture mixtures, having an improved flow control.

SUMMARY

It is an object of the invention to at least partly overcome one or more limitations of the prior art. In particular, it is an object to provide a centrifugal separator for separating a cell culture mixture having an improved flow control.

As a first aspect of the invention, there is provided a centrifugal separator for separation of a liquid mixture comprising a stationary frame, a rotatable assembly and a drive unit for rotating the rotatable assembly relative the frame around an axis of rotation (X), wherein the rotatable assembly comprises a rotor casing enclosing a separation space in which a stack of separation discs is arranged to rotate around a vertical axis (X) of rotation; said rotor casing further comprising a mechanically hermetically sealed inlet for supply of said liquid mixture to said separation space;

a first liquid outlet that is mechanically hermetically sealed and arranged for discharge of a separated liquid phase and a second liquid outlet that is mechanically hermetically sealed and arranged for discharge of a separated heavy phase; said heavy phase having a density that is higher than said liquid phase;

and wherein said separator further comprises at least one positive displacement pump arranged downstream of said second liquid outlet for transporting the separated heavy phase from said separation space; at least one positive displacement pump (60) arranged downstream of said first liquid outlet (21) for transporting the separated liquid phase from said separation space (17).

The inventors have found that the flow through a separator for separation of a cell culture mixture may be unstable and that the liquid level, i.e. the radial position of the interface between separated phases within the rotating bowl of the centrifugal separator, may be sensitive to the positioning and length of the pipe or tubing arranged for transporting the separated heavy phase. The first aspect of the invention is based on the insight that the addition of at least one positive displacement pump downstream of the outlets may resolve such issues, thereby allowing for increased flow control of the separator. The positive displacement pump may thus act as a flow limitation and a pump at the same time and therefore aid in obtaining stable running conditions. This may prevent product loss and accumulation of separated heavy phase at the heavy phase outlet or in the rotor casing. Such accumulation of separated heavy phase may decrease the separation performance of the separator.

In addition, the feed pressure in the system may be reduced, i.e. the liquid mixture to be separated may be supplied to the centrifugal separator with a reduced pressure, which is thus an advantage when separating cell culture mixtures that may be sensitive to high forces.

The stationary frame of the centrifugal separator is a non-rotating part, and the rotatable assembly is supported by the frame, e.g. by means of at least one ball bearing.

The centrifugal separator further comprises a drive member arranged for rotating the rotatable assembly and may comprise an electrical motor or be arranged to rotate the rotatable assembly by suitable transmission, such as a belt or a gear transmission.

The rotatable assembly comprises a rotor casing in which the separation takes place. The rotor casing encloses a separation space in which the separation of the fluid mixture, such as a cell culture mixture, takes place. The rotor casing may be a solid rotor casing and be free of any further outlets for separated phases. Thus, the solid rotor casing may be solid in that it is free of any peripheral ports for discharging e.g. a sludge phase accumulated at the periphery of the separation space. However, in embodiments, the rotor casing comprises peripheral ports for intermittent or continuous discharge of a separated phase from the periphery of the separation space.

The separation space comprises a stack of separation discs arranged centrally around the axis of rotation (X). The stack may comprise frustoconical separation discs.

The separation discs may thus have a frustoconical shape, which refers to a shape having the shape of a frustum of a cone, which is the shape of a cone with the narrow end, or tip, removed. A frustoconical shape has thus an imaginary apex where the tip or apex of the corresponding conical shape is located. The axis of the frustoconical shape is axially aligned with the rotational axis X of the solid rotor casing. The axis of the frustoconical portion is the direction of the height of the corresponding conical shape or the direction of the axis passing through the apex of the corresponding conical shape.

The separation discs may alternatively be axial discs arranged around the axis of rotation.

The separation discs may e.g. comprise a metal or be of metal material, such as stainless steel. The separation discs may further comprise a plastic material or be of a plastic material.

The mechanically hermetically sealed inlet is for receiving the fluid to be separated and to guide the fluid to the separation space. Also the first and second liquid outlets are mechanically hermetically sealed.

A mechanical hermetic seal refers to a seal that is supposed to give rise to an air tight seal between a stationary portion, such as a conduit for transporting liquid mixture to be separated or a separated liquid phase, and the rotor casing and prevent air from outside the rotor casing to contaminate the feed and liquid to leak out. Therefore, the rotor casing may be arranged to be completely filled with liquid, such as cell culture mixture, during operation. This means that no air or free liquid surfaces is meant to be present in the rotor casing during operation.

In embodiments of the first aspect, the hermetically sealed inlet is arranged at a first axial end of said rotor casing and arranged so that the liquid mixture to be separated enters said rotor casing at the rotational axis (X). Further, the second liquid outlet may be arranged at a second axial end of said rotor casing opposite said first end and arranged so that said separated heavy phase is discharged at the rotational axis (X). Thus, the inlet may be arranged at a first axial end, such as the lower axial end, of the rotor casing whereas the second mechanically hermetically sealed liquid outlet is arranged at the opposite axial end, such as the upper axial end, of the rotor. The first mechanically hermetically sealed liquid outlet for discharge of a separated liquid phase may be arranged at the lower axial end or at the upper axial end of the rotor casing.

It may be advantageous if e.g. a cell culture can enter and leave the rotating parts of the separator at the rotational axis (X). This imparts less rotational energy for the separated cells that leaves the separator and thus decreases the risk of cell breakage. Separated heavy phase, such as a cell phase, may be discharged from the rotor casing, and from the rotatable assembly, at rotational axis (X).

In embodiments of the first aspect the centrifugal separator further comprises a first rotatable seal for sealing and connecting said inlet to a stationary inlet conduit, wherein at least a part of said stationary inlet conduit is arranged around rotational axis (X).

The first rotatable seal may thus be a mechanical hermetic seal, which is a rotatable seal for connecting and sealing the inlet to a stationary inlet conduit. The first rotatable seal may be arranged at border of the rotor casing and stationary portion of the frame and may thus comprise a stationary part and a rotatable part.

The stationary inlet conduit may thus also be part of the stationary frame and is arranged at the rotational axis (X).

The first rotatable seal may be a double seal that also seals the first mechanically hermetically sealed liquid outlet for discharging the separated liquid phase.

In embodiments of the first aspect, the centrifugal separator further comprises a second rotatable seal for sealing and connecting said second liquid outlet to a stationary outlet conduit arranged around rotational axis, and wherein said positive displacement pump is configured for providing a flow of separated heavy phase in said stationary outlet conduit.

In analogy, the second rotatable seal may also be a mechanical hermetic seal, which is a rotatable seal for connecting and sealing the outlet to a stationary outlet conduit. The second rotatable seal may be arranged at border of the rotor casing and stationary portion of the frame and may thus comprise a stationary part and a rotatable part.

The stationary outlet conduit may thus also be part of the stationary frame and is arranged at the rotational axis (X).

In embodiments of the first aspect, the rotatable assembly further comprises at least one outlet conduit for transporting the separated heavy phase from the separation space to the second mechanically hermetically sealed liquid outlet, said conduit extending from a radially outer position of said separation space to said second mechanically hermetically sealed liquid outlet, i.e. the heavy phase outlet. The outlet conduit may have a conduit inlet arranged at the radially outer position and a conduit outlet at a radially inner position. Consequently, then the heavy phase outlet is at radially inner position. This outlet conduit may be arranged in an upper portion of the separation space.

As an example, the conduit inlet may be arranged at the radially outer position and a conduit outlet at a radially inner position. Further, the at least one outlet conduit may be arranged with an upward tilt from the conduit inlet to the pipe outlet.

Thus, relative the radial plane, the conduit may be tilted axially upwards from the conduit inlet in the separation space to the conduit outlet at the heavy phase outlet. This may facilitate transport of the separated cell phase in the conduit.

The conduit inlet may be arranged at an axially upper position in the separation space. The conduit inlet may be arranged at an axial position where the separation space has its largest inner diameter.

The outlet conduit may be a pipe. As an example, the rotor casing may comprise a single outlet conduit.

As an example, the at least one outlet conduit is tilted with an upward tilt of at least 2 degrees relative the radial plane. As an example, the at least one outlet conduit may be tilted with an upward tilt of at least 5 degrees, such as at least 10 degrees, relative the radial plane.

The at least one outlet conduit may facilitate transport of the separated heavy phase in the separation space to the heavy phase outlet.

The positive displacement pump may be configured to provide a constant flow at a fixed speed despite changes in counter pressure. As an example, the positive displacement pump may be arranged for ensuring that the split in the separator between the separated light phase and heavy phase is correct and independent on the flow of liquid mixture to be separated to the inlet.

The positive displacement pump may for example be a rotary pump. The volume flow provided by a positive displacement pump may not be constant, i.e. I may provide a pulsating flow.

Moreover, the positive displacement pump may be configured to transport the separated heavy phase downstream of the second liquid outlet by trapping a volume of liquid and displacing this volume into a discharge pipe of the pump. Thus, the positive displacement pump may comprise an inlet connected to the tubing or pipe through which separated liquid heavy phase is discharged from the separator and an outlet through separated liquid heavy phase that has been pumped to move exits the positive displacement pump.

In embodiments of the first aspect at least one positive displacement pump is configured for providing a suction force and/or a counter pressure. The pump may thus be arranged such that it provides a suction force to the liquid mixture that is separated in the separator and thus also to the discharged separated heavy phase.

The positive displacement pump may be configured for providing a variable positive pressure to the discharged heavy phase. Providing a variable positive pressure may allow for transport of separated heavy phase to receiving vessels some distance from the centrifugal separator.

In embodiments of the first aspect, he at least one positive displacement pump is a peristaltic pump.

The peristaltic pump may be a roller pump. Such a pump may comprise a flexible tube connected to the tubing or pipe through which the separated heavy phase is discharged and a rotor with a number of elements arranged for compressing the flexible tube upon rotation. As the rotor turns, part of the tubing under compression may be pinched, thereby occluding the tubing and forcing the separated heavy phase to be pumped through the tubing and to an outlet of the peristaltic pump.

In embodiments of the first aspect, the at least one positive displacement pump arranged downstream of the second liquid outlet is configured for stopping the flow of separated heavy phase when not in operation.

Thus, the positive displacement pump may also function as a regulating valve such that the flow of separated heavy phase is stopped when the pump is not in operation. This may also aid in deaeration of the centrifugal separator and also facilitate purging of the separator e.g. at the end of a separation process.

As an example, the centrifugal separator may be free of any valves between the second liquid outlet and the at least one positive displacement pump arranged downstream of the second liquid outlet. Consequently, the use of a positive displacement pump makes it possible to exclude a regulating valve at the heavy phase outlet, since the pump in itself may function as the valve.

The centrifugal separator of the first aspect may comprise at least one pressure sensor downstream of said second liquid outlet.

The centrifugal separator of the first aspect may comprise a regulating valve sensor arranged downstream of the first liquid outlet, i.e. downstream of the liquid light outlet.

In embodiments of the first aspect, the centrifugal separator further comprises at least one pressure sensor arranged downstream of said second liquid outlet and a regulating valve arranged downstream of said first liquid outlet, and wherein said valve is configured to operate based on data generated by said pressure sensor.

Thus, the positive displacement pump may be arranged and used so as to control the spilt between separated liquid light phase and separated liquid heavy phase. The regulating valve downstream of the liquid light outlet, i.e. the first liquid outlet, may thus aid the positive displacement pump by throttling the discharged light phase, thereby giving rise to a positive pressure at the heavy phase outlet. The regulating valve downstream of the liquid light outlet may thus be regulated based on pressure data generated at the heavy phase outlet.

In embodiments of the first aspect, the centrifugal separator further comprises at least one pressure sensor arranged downstream of said second liquid outlet, and wherein the at least one positive displacement pump arranged downstream of the second liquid outlet is configured to operate based on data generated by said pressure sensor.

Thus, the pressure sensor at the heavy phase outlet may be used to provide pressure data to control the positive displacement pump, such as when to start and stop and the amount of positive pressure to apply to the heavy phase.

In order to operate the regulating valve downstream of the liquid light outlet and/or the at least one positive displacement pump based on pressure data from the pressure sensor, the centrifugal separator may comprise a control unit configured to send operational requests to the regulating valve and/or positive displacement pump based on input received from the pressure sensor. Thus, the control unit may comprise computer program products configured for performing a method of receiving pressure data from the pressure sensor and adjusting the regulating valve and/or positive pressure on the discharged heavy phase based on the received data. The control unit may comprise a processor and communication interface for communicating with the pressure sensor, the regulating valve and/or the positive displacement pump.

As discussed above, the centrifugal separator further comprises at least one positive displacement pump arranged downstream of said first liquid outlet for transporting the separated liquid phase from said separation space.

Any positive displacement pump arranged downstream of the liquid light outlet may be of the same type as the positive displacement pump arranged downstream of the second outlet. Thus, the positive displacement pump arranged downstream of the liquid light outlet may be a s discussed above, and e.g. be a peristaltic pump.

Having a positive displacement pump arranged downstream of the liquid light outlet may provide for a better operational control of the whole system, since a positive displacement pump may more precisely regulate a flow than a regulating valve.

Further, the centrifugal separator may then be free of any valves between the first liquid outlet and the at least one positive displacement pump arranged downstream of said first liquid outlet.

Thus, having a positive displacement pump arranged downstream of the liquid light outlet may allow for removal of any regulating valve arranged downstream of the liquid light outlet, since the pump in itself may function as the valve.

In embodiments of the first aspect, the centrifugal separator is free of any feed pump for supplying the liquid mixture to be separated. Instead, the separator may be configured for supplying feed to the inlet solely by means of the suction force generated by the positive displacement pump arranged downstream of the second liquid outlet and, if a positive displacement pump is also arranged downstream of the liquid light outlet, also from such a pump. Thus, in embodiments, the separator comprises at least one positive displacement pump arranged downstream of said first liquid outlet, and wherein the separator is configured for supplying liquid mixture to be separated solely by the suction force generated by the positive displacement pumps.

In embodiments of the first aspect, the rotatable assembly comprises an exchangeable separation insert and a rotatable member; said insert comprising said rotor casing and being supported by said rotatable member.

The exchangeable separation insert may thus be a pre-assembled insert being mounted into the rotatable member, which may function as a rotatable support for the insert. The exchangeable insert may thus easily be inserted and disengaged from the rotatable member as a single unit.

According to embodiments, the exchangeable separation insert is a single use separation insert. Thus, the insert may be adapted for single use and be a disposable insert. The exchangeable insert may thus be for processing of one product batch, such as a single product batch in the pharmaceutical industry, and then be disposed.

The exchangeable separation insert may comprise a polymeric material or consist of a polymeric material. As an example, the rotor casing and the stack of separation discs may comprise, or be of a polymeric material, such as polypropylene, platinum cured silicone or BPA free polycarbonate. The polymer parts of the insert may be injection moulded. However, the exchangeable separation insert may also comprise metal parts, such as stainless steel. For example, the stack of separation discs may comprise discs of stainless steel.

The exchangeable insert may be a sealed sterile unit.

Further, if the rotor casing is an exchangeable separation insert, the rotor casing may be arranged to be solely externally supported by external bearings.

Furthermore, the exchangeable separation insert, and the rotatable member, may be free of any rotatable shaft that is arranged to be supported by external bearings.

As an example, the outer surface of the exchangeable insert may be engaged within a supporting surface of the rotatable member, thereby supporting said exchangeable insert within said rotatable member.

Consequently, the centrifugal separator may be a modular centrifugal separator or comprising a base unit and the rotatable assembly comprising an exchangeable separation insert. The base unit may comprise a stationary frame and a drive unit for rotating the rotatable assembly about the axis of rotation. The rotatable assembly may have a first axial end and a second axial end, and may delimit an inner space at least in a radial direction, the inner space being configured for receiving at least one part of the exchangeable separation insert therein. The rotatable assembly may be provided with a first through opening to the inner space at the first axial end and configured for a first fluid connection of the exchangeable separation insert to extend through the first through opening. The rotatable assembly may also comprise a second through opening to the inner space at the second axial end and configured for a second fluid connection of the exchangeable separation insert to extend through the second through opening.

As a configuration of the first aspect discussed above, there is provided

- a centrifugal separator for separation of a liquid mixture comprising
- a stationary frame, a rotatable assembly and a drive unit for rotating the rotatable assembly relative the frame around an axis of rotation (X), wherein the rotatable assembly comprises
- a rotor casing enclosing a separation space in which a stack of separation discs is arranged to rotate around a vertical axis (X) of rotation; said rotor casing further comprising
- a mechanically hermetically sealed inlet for supply of said liquid mixture to said separation space;
- a first liquid outlet that is mechanically hermetically sealed and arranged for discharge of a separated liquid phase and a second liquid outlet that is mechanically hermetically sealed and arranged for discharge of a separated heavy phase; said heavy phase having a density that is higher than said liquid phase;
- and wherein said separator further comprises
- at least one positive displacement pump arranged downstream of said second liquid outlet for transporting the separated heavy phase from said separation space.

In this configuration, there is only at least one positive displacement pump arranged downstream of said second liquid outlet.

As a second aspect of the invention, there is provided a method for separating a liquid mixture comprising the steps of:

- a) providing a centrifugal separator according to the first aspect of the invention;
- b) supplying said liquid mixture to be separated to said inlet, and
- c) discharging a separated heavy phase via said second mechanically hermetically sealed liquid outlet and a liquid phase via said first hermetically sealed liquid outlet;
- wherein the step b) of supplying the liquid mixture to be separated is at least partly performed by applying a pressure with said at least one positive displacement pump (50) arranged downstream of said second liquid outlet and/or said at least one positive displacement pump arranged downstream of said first liquid outlet.

The second aspect may generally present the same or corresponding advantages as the former aspect. The terms and definitions used in relation to the second aspect are the same as discussed in relation to the first aspect above.

The positive displacement pump may thus be used for at least partly transporting the liquid mixture to be separated to the inlet of the separator. This may allow for a reduction of the feed pressure, i.e. the pressure of the liquid mixture to be separated. Therefore, the method of the second aspect is more gentle to the product, such as cells, that are to be separated. Further, a reduced pressure of the liquid mixture to be separated is also advantageous in that the pressure requirement of any sealing liquid used is seals of the separator is reduced.

In embodiments of the second aspect, step b) of supplying the liquid mixture to be separated is solely performed by applying a pressure with said at least one positive displacement pump arranged downstream of said second liquid outlet and/or said at least one positive displacement pump arranged downstream of said first liquid outlet.

Consequently, the method allows for applying a negative pressure to the separator to such an extent that the need of having a feed pump for pumping the liquid mixture to the inlet is eliminated.

In embodiments of the second aspect, the method further comprises a step of estimating the flow of discharged heavy phase though the at least one positive displacement pump. This may be performed by estimating the rotational speed of the pump and the pressure just upstream of the pump. The rotational speed and the pressure of the discharged heavy phase entering the pump may thus be used to calculate the flow through the pump.

As an example, the method may further comprise a step of operating the positive displacement pump based on the estimated flow through the pump. Thus, with knowledge of the pressure of the discharged heavy phase entering the pump, it is possible to control the absolute flow, such as volume flow or mass flow, through the pump by adjusting the rotational speed of the pump.

In embodiments of the second aspect, the liquid mixture is a cell culture mixture.

The cells may be shear sensitive cells, such as selected from Chinese hamster ovary (CHO) cells and mammalian cells.

As a third aspect of the invention, there is provided a method of deaerating a centrifugal separator comprising the steps of i) providing a centrifugal separator according to the first aspect; and ii) applying a negative pressure in said centrifugal separator at standstill of said separator using said at least one positive displacement pump, thereby removing air trapped in said centrifugal separator.

Thus, the centrifugal separator of the present disclosure may also aid in deaerating the separator and feed lines connected to the separator. Further, it may aid in priming of the feed pump such is used for pumping liquid mixture to the separator.

As a fourth aspect of the invention, there is provided a system for separating a cell culture mixture, comprising a centrifugal separator according to the first aspect of the invention;

a fermenter for hosting a cell culture mixture;

a connection from the bottom of the fermenter to the centrifugal separator arranged so that the cell culture mixture to be separated is supplied to the inlet at the axially lower end of the centrifugal separator.

The fermenter may be a fermenter tank. The connection may be any suitable connection, such as a pipe. The connection may be a direct connection between fermenter and the centrifugal separator.

BRIEF DESCRIPTION OF THE DRAWINGS

The above, as well as additional objects, features and advantages of the present inventive concept, will be better understood through the following illustrative and non-limiting detailed description, with reference to the appended drawings. In the drawings like reference numerals will be used for like elements unless stated otherwise.

DETAILED DESCRIPTION

FIGS. 1*a-f* show schematic views of a centrifugal separator 100 of the present disclosure having a positive displacement pump 50 arranged downstream of the second liquid outlet, i.e. the heavy phase outlet. For clarity reasons, only the outside of the rotatable assembly 101 is shown.

Figure 1A:
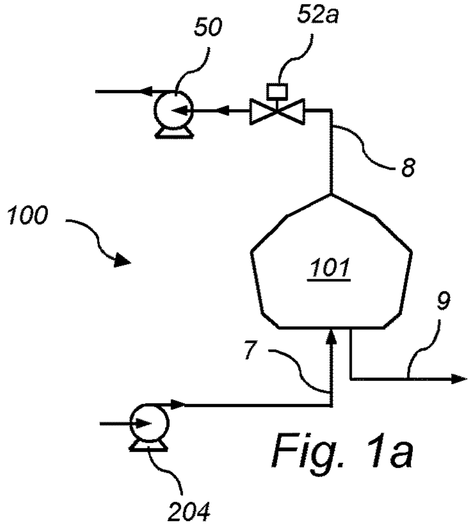
FIG. 1*a-f* are schematic views of a centrifugal separator of the present disclosure comprising a positive displacement pump downstream of the heavy phase outlet.
Figure 1B:
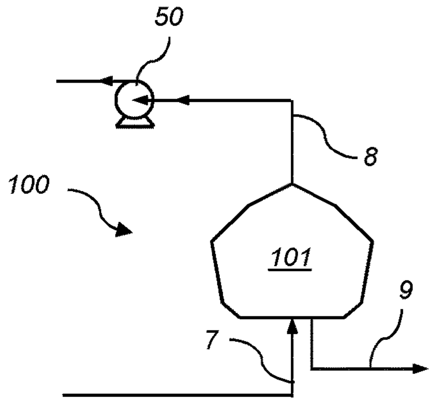

In FIG. 1*a*, liquid mixture to be separated is supplied to the rotatable assembly via stationary inlet pipe 7 by means of a feed pump 204. After separation of within the separation space of the rotatable assembly, separated liquid light phase is discharged though a first liquid outlet to stationary outlet pipe 9, whereas separated heavy phase is discharged via a second liquid outlet to stationary outlet pipe 8. There is a positive displacement pump 50 in the form of a peristaltic pump arranged for applying a suction force to the discharged separated heavy phase in outlet conduit 8, i.e. the pump 50 is arranged downstream of the second liquid outlet (not shown in FIG. 1*a*) of the separator 100. In the embodiment shown in FIG. 1*a*, there is also a regulating valve 52*a* arranged upstream of the positive displacement pump 50. However, as illustrated in FIG. 1*b*, the regulating valve 52*a* may be omitted, since the positive displacement pump 50 may also function as a regulating valve which may control the flow of separated heavy phase though it very accurately even if the system is unstable. Consequently, the at least one positive displacement pump 50 may be configured for stopping the flow of separated heavy phase when not in operation and be free of any valves 52*a* between the second liquid outlet and the at least one positive displacement pump 50.

As further illustrated in FIG. 1*b*, the separator 100 does not have a feed pump 204 for supplying the liquid mixture to be separated. Instead, the feed may be supplied solely by applying a negative pressure by the positive displacement pump 50, i.e. provide a suction force to the liquid mixture to be separated such that the liquid mixture is sucked through the separator instead of pushed through the separator.

Figure 1C:
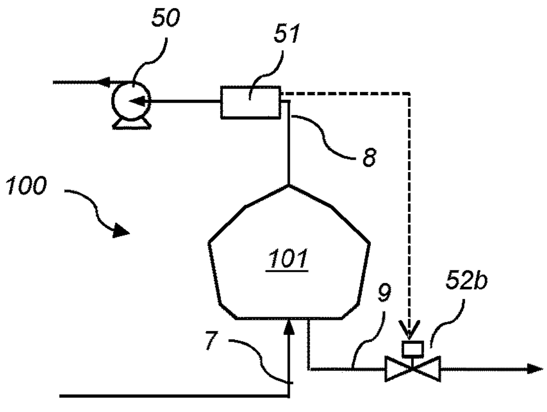
Figure 1D:
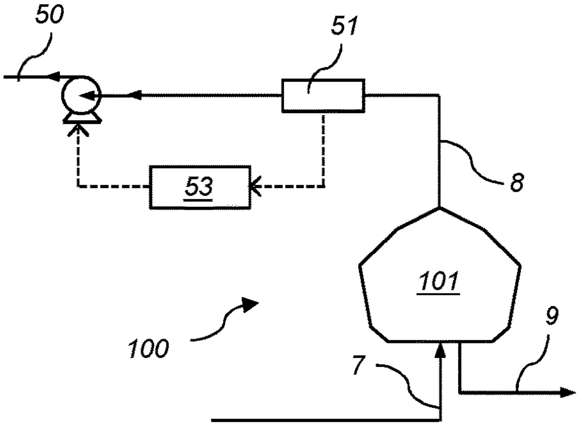

The centrifugal separator may 100 comprise a pressure sensor 51 arranged for measuring the pressure of the discharged heavy phase. Such embodiments are illustrated in FIGS. 1*c* and 1*d*, in which the pressure sensor 51 is arranged between the heavy phase outlet and the positive displacement pump 50. As illustrated in FIG. 1*c*, the data generated by the pressure sensor 51 may be used to control a regulating valve 52*b* arranged downstream of the first liquid outlet, i.e. downstream of the liquid light phase outlet. This valve 52*b* supports the work of the positive displacement pump 50 by throttling or restricting the flow of the discharged light phase, thereby giving rise to a positive pressure at the heavy phase outlet. The positive displacement pump may be arranged for ensuring that the split in the separator 100 between the separated light phase and heavy phase is independent on the flow of liquid mixture to be separated to the inlet, and the regulating valve 52*b* may thus be used to support the pump 50 and be regulated based on pressure data generated at the heavy phase outlet.

A pressure sensor 51 arranged downstream of the heavy phase outlet 22 of the separator, such as upstream of downstream of the positive displacement pump, may also be used to regulate the positive displacement pump 50, such as the rotational speed of the pump. Thus, also the at least one positive displacement pump 50 may be configured to operate based on data generated by said pressure sensor 51.

As illustrated in FIG. 1*d*, control of the pump 50 using data generated by the pressure sensor 51 may be performed using a control unit 53. The control unit 53 is in this embodiment connected to the pressure sensor 51 and to the positive displacement pump 50. The control unit 53 comprises a communication interface, such as a transmitter/receiver, via which it may receive pressure data from the pressure sensor 51. The control unit 53 is thus configured for receiving information of the pressure of the discharged heavy phase within the outlet conduit 8.

The control unit 53 may further be configured to compare the received pressure information with e.g. reference values.

For this purpose, the control unit 53 may comprise a device having processing capability in the form of processing unit, such as a central processing unit, which is configured to execute computer code instructions which for instance may be stored on a memory. The processing unit may alternatively be in the form of a hardware component, such as an application specific integrated circuit, a field-programmable gate array or the like.

The control unit 53 is in this example also configured for controlling the speed of the positive displacement pump 50 and thereby the volume or mass flow of the discharged heavy. For this purpose, the processing unit may further comprise computer code instructions for sending operational requests to the positive displacement pump 50.

In analogy, the same or a different control unit may also be used to control the regulating valve 52*b* downstream of the first liquid outlet based on the pressure data generated by the pressure sensor. Thus, a control unit may be used to control the regulating valve 52*b* in the embodiment illustrated in FIG. 1*c*.

Figure 1E:
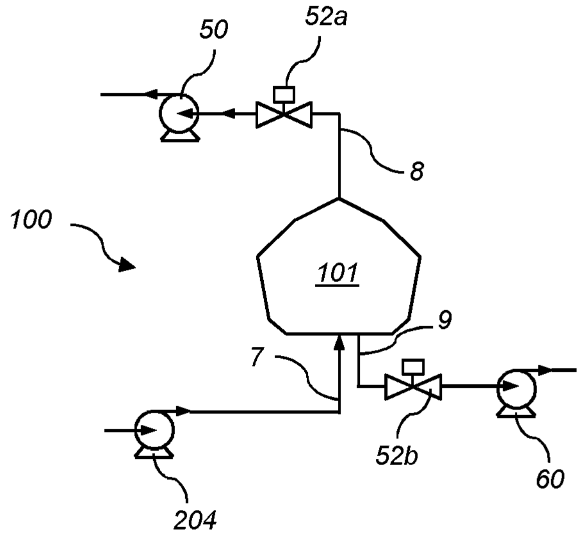
Figure 1F:
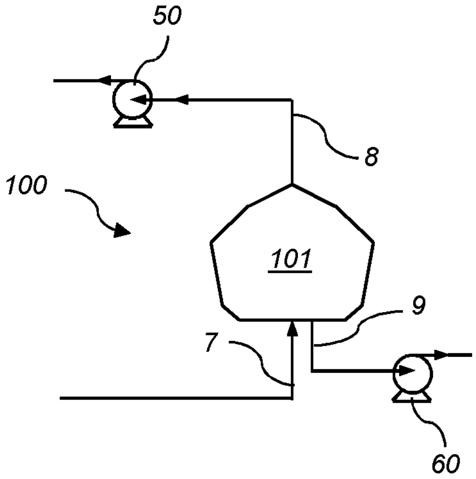

FIG. 1*e* illustrates an embodiment in which the centrifugal separator 100 also comprises a positive displacement pump 60 arranged downstream of the first liquid outlet. This pump may be of the same or different type as the positive displacement pump 50 arranged downstream of the heavy phase outlet. The use of positive displacement pumps 50, 60 arranged at both outlets allows for better control of the whole separation process in the centrifugal separator 100. Further, the use of a positive displacement pump 60 arranged downstream of the first liquid outlet also facilitates having no regulating valve 52*b* arranged downstream of the first liquid outlet, since the pump 60 itself may have a regulating function. Such an embodiment is illustrated in FIG. 1*f*. Also, the use of positive displacement pumps 50, 60, such as peristaltic pumps, downstream of both liquid outlets makes it possible to have a separator 100 without any feed pump 204 for pumping liquid mixture to the separator 100, which is also illustrated in the embodiment of FIG. 1*f*. Instead, the liquid mixture to be separated may be drawn to a through the separator 100 using solely the suction force provided by one or both positive displacement pumps 50, 60. This may be advantageous if the liquid mixture is a cell culture, since cells may be sensitive to high pressures generated at the inlet of the separator 100 due to a feed pump 204.

Figure 2:
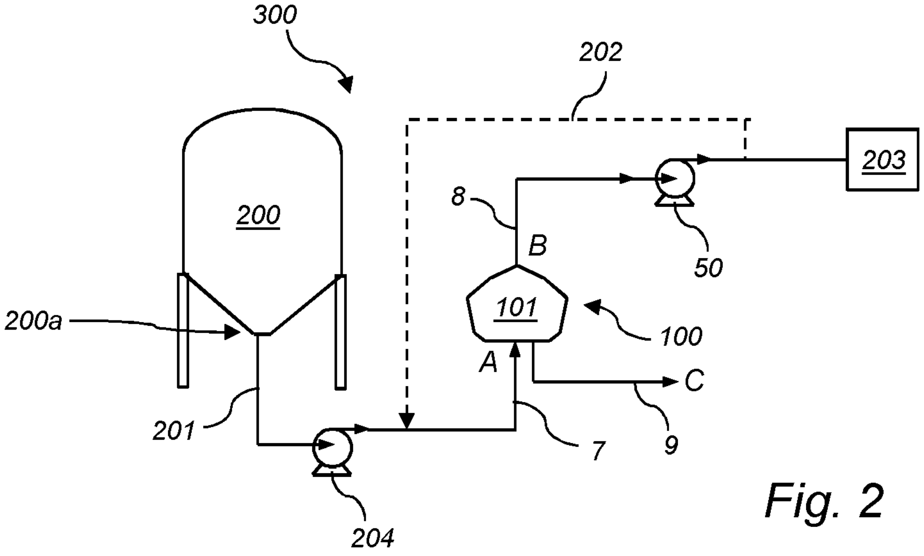
FIG. 2 is a schematic illustration of a system for separating a cell culture mixture.

FIG. 2 is a schematic illustration of a system 300 for separating a cell culture mixture in which a separator 100 as discussed in relation to FIGS. 1*a-c* is used. The system 300 comprises a fermenter tank 200 in which comprises a cell culture mixture. The fermenter tank 200 has an axially upper portion and an axially lower portion 200*a*. The fermentation may for example be for expression of an extracellular biomolecule, such as an antibody, from a mammalian cell culture mixture. After fermentation, the cell culture mixture is separated in a centrifugal separator 100 according to the present disclosure. As seen in FIG. 2, the bottom of the fermenter tank 200 is connected via a connection 201 to the bottom of the separator 100 to the inlet conduit 7 of the separator. The connection 201 may be a direct connection or a connection via any other processing equipment, such as a tank. Thus, the connection 201 allows for supply of the cell culture mixture from the axially lower portion 200*a* of the fermenter tank 200 to the inlet at the axially lower end of the centrifugal separator 100, as indicated by arrow "A". There may, as discussed in relation to FIG. 1*a*, be a feed pump (not shown in FIG. 2) arranged for pumping the feed, i.e. the cell culture mixture from fermentation tank 200, to the inlet of the separator.

After separation, the separated cell phase of higher density is discharged via the second liquid outlet at the top of the separator, as indicated by arrow "B", to stationary outlet conduit 8, whereas the separated liquid light phase of lower density, comprising the expressed biomolecule, is discharged via the liquid light phase outlet at the bottom of the separator 100 to stationary outlet conduit 9, as indicated by arrow "C". The positive displacement pump 50 provides a suction force to the discharged cell phase and thus allows for a lower feed pressure to be used with feed pump 204, which thus facilitates a more gentle treatment of the cells in the separator 100. As an alternative, the feed pump 204 may be completely omitted, and the cells may be drawn to the separator 100 solely by the use of the suction force generated by the positive displacement pump 50. As discussed in relation to FIGS. 1*e* and 1*f* above, there may also be a positive displacement pump arranged downstream of the liquid light phase outlet, such as connected to stationary outlet conduit 9. This may thus also be used for providing a suction force to the cell phase that is to be separated in the separator 100.

The separated cell phase may be discharged using the positive displacement pump 50 to a tank 203 for re-use in a subsequent fermentation process, e.g. in the fermenter tank 200. The separated cell phase may further be recirculated to the feed inlet of the separator 100, as indicated by connection 202. The separated liquid light phase may be discharged via outlet conduit 9 to further process equipment for subsequent purification of the expressed biomolecule.

Figure 3:
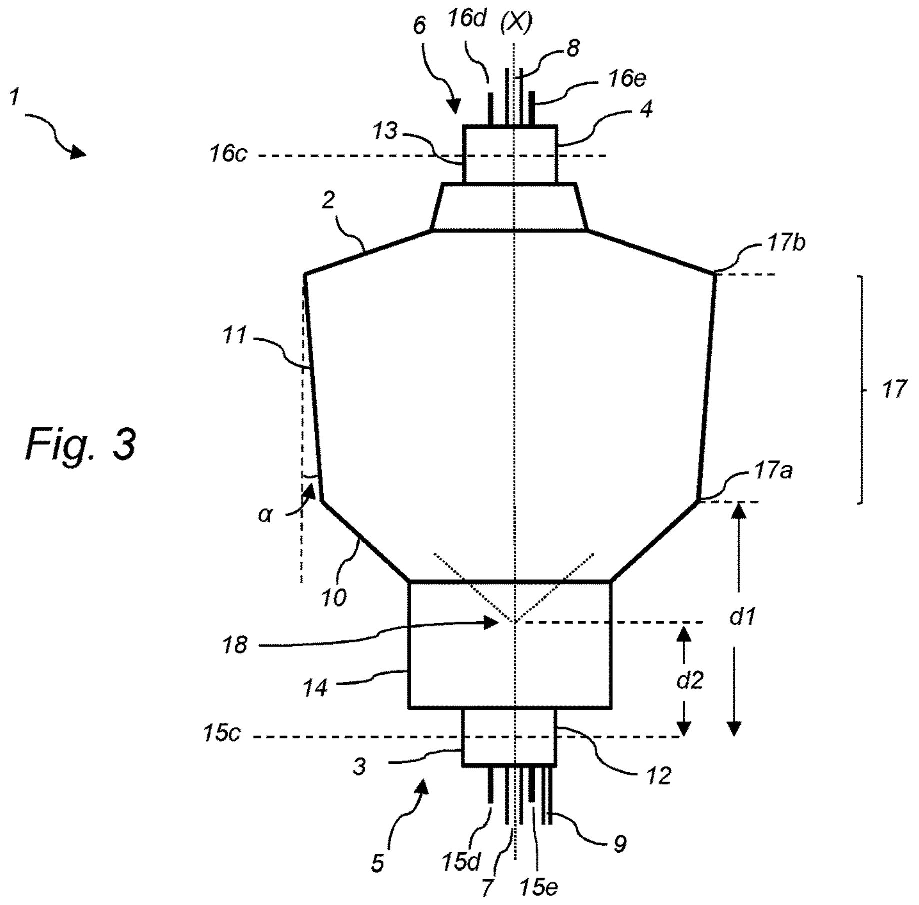
FIG. 3 is schematic outer side view of a rotor casing forming an exchangeable separation insert for a centrifugal separator for separating a cell culture mixture.

FIG. 3 shows an outer side view of a rotatable member in the form of an exchangeable separation insert 1 that may be used in a centrifugal separator 100 of the present disclosure.

The insert 1 comprises a rotor casing 2 arranged between a first, lower stationary portion 3 and a second, upper stationary portion 4, as seen in the axial direction defined by rotational axis (X). The first stationary portion 3 is at the lower axial end 5 of the insert 1, whereas the second stationary portion 4 is arranged at the upper axial end 6 of the insert 1.

The feed inlet is in this example arranged at the axial lower end 5, and the feed is supplied via a stationary inlet conduit 7 arranged in the first stationary portion 3. The stationary inlet conduit 7 is arranged at the rotational axis (X). The first stationary portion 3 further comprises a stationary outlet conduit 9 for the separated liquid phase of lower density, also called the separated liquid light phase.

There is further a stationary outlet conduit 8 arranged in the upper stationary portion 4 for discharge of the separated phase of higher density, also called the liquid heavy phase. Thus, in this embodiment, the feed is supplied via the lower axial end 5, the separated light phase is discharged via the lower axial end 5, whereas the separated heavy phase is discharged via the upper axial end 6.

The outer surface of the rotor casing 2 comprises a first 10 and second 11 frustoconical portion. The first frustoconical portion 10 is arranged axially below the second frustoconical portion 11. The outer surface is arranged such that the imaginary apex of the first 10 and second 11 frustoconical portions both point in the same axial direction along the rotational axis (X), which in this case is axially down towards the lower axial end 5 of the insert 1.

Furthermore, the first frustoconical portion 10 has an opening angle that is larger than the opening angle of the second frustoconical portion 11. The opening angle of the first frustoconical portion may be substantially the same as the opening angle of a stack of separation discs contained within the separation space 17 of the rotor casing 2. The opening angle of the second frustoconical portion 11 may be smaller than the opening angle of a stack of separation discs contained within the separation space of the rotor casing 2. As an example, the opening angle of the second frustoconical portion 11 may be such that the outer surface forms an angle α with rotational axis that is less than 10 degrees, such as less than 5 degrees. The rotor casing 2 having the two frustoconical portions 10 and 11 with imaginary apexes pointing downwards allows for the insert 1 to be inserted into a rotatable member 30 from above. Thus, the shape of the outer surface increases the compatibility with an external rotatable member 30, which may engage the whole, or part of the outer surface of the rotor casing 2, such as engage the first 10 and second 11 frustoconical portions.

There is a lower rotatable seal arranged within lower seal housing 12 which separates the rotor casing 2 from the first stationary portion 3 and an upper rotatable seal arranged within upper seal housing 13 which separates the rotor casing 2 from the second stationary portion 4. The axial position of the sealing interface within the lower seal housing 12 is denoted 15*c*, and the axial position of the sealing interface within the upper seal housing 13 is denoted 16*c*. Thus, the sealing interfaces formed between such stationary part 15*a*, 16*a* and rotatable part 15*b*, 16*b* of the first 15 and second 16 rotatable seals also form the interfaces or border between the rotor casing 2 and the first 15 and second 16 stationary portions of the insert 1.

There are further a seal fluid inlet 15*d* and a seal fluid outlet 15*e* for supplying and withdrawing a seal fluid, such as a cooling liquid, to the first rotatable seal 15 and in analogy, a seal fluid inlet 16*d* and a seal fluid outlet 16*e* for supplying and withdrawing a seal fluid, such as a cooling liquid, to the second rotatable seal 16.

Shown in FIG. 3 is also the axial positions of the separation space 17 enclosed within the rotor casing 2. In this embodiment, the separation space is substantially positioned within the second frustoconical portion 11 of the rotor casing 2. The heavy phase collection space 17*c* of the separation space 17 extends from a first, lower, axial position 17*a* to a second, upper, axial position 17*b*. The inner peripheral surface of the separation space 17 may form an angle with the rotational axis (X) that is substantially the same as angle α, i.e. the angle between the outer surface of the second frustoconical portion 11 and the rotational axis (X). The inner diameter of the separation space 17 may thus increase continuously from the first axial position 17*a* to the second axial position 17*b*. Angle α may be less than 10 degrees, such as less than 5 degrees.

The exchangeable separation insert 1 has a compact form that increases the maneuverability and handling of the insert 1 by an operator. As an example, the axial distance between the separation space 17 and the first stationary portion 3 at the lower axial end 5 of the insert may be less than 20 cm, such as less than 15 cm. This distance is denoted d1 in FIG. 3, and is in this embodiment the distance from the lowest axial position 17*a* of the heavy phase collection space 17*c* of the separation space 17 to the sealing interface 15*c* of the first rotatable seal 15. As a further example, if the separation space 17 comprises a stack of frustoconical separation discs, the frustoconical separation disc that is axially lowest in the stack and closest to the first stationary portion 3, may be arranged with the imaginary apex 18 positioned at an axial distance d2 from the first stationary portion 3 that is less than 10 cm, such as less than 5 cm. Distance d2 is in this embodiment the distance from the imaginary apex 18 of the axially lowermost separation disc to the sealing interface of the first rotatable seal 15.

Figure 4:
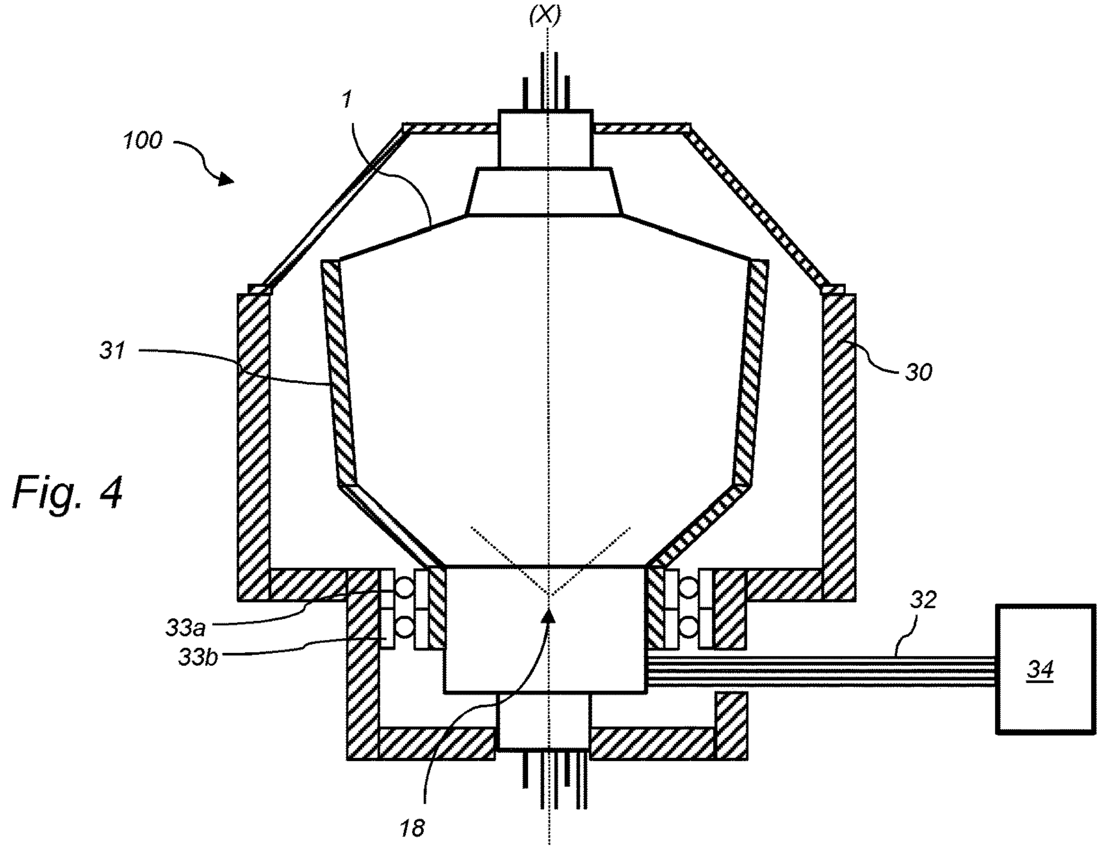
FIG. 4 is a schematic section of a centrifugal separator comprising an exchangeable insert as shown in FIG. 3.

FIG. 4 shows a schematic drawing of the exchangeable separation insert 1 being inserted within centrifugal separator 100, which comprises a stationary frame 30 and a rotatable member 31 that is supported by the frame by means of supporting means in the form of an upper and lower ball bearing 33*a*, 33*b*. There is also a drive unit 34, which in this case is arranged for rotating the rotatable member 31 around the axis of rotation 31 via drive belt 32. However, other driving means are possible, such as an electrical direct drive.

The exchangeable separation insert 1 is inserted and secured within rotatable member 31. The rotatable member 31 thus comprises an inner surface for engaging with the outer surface of the rotor casing 2. The upper and lower ball bearings 33*a*, 33*b* are both positioned axially below the separation space 17 within the rotor casing 2 such that the cylindrical portion 14 of the outer surface of the rotor casing 2 is positioned axially at the bearing planes. The cylindrical portion 14 thus facilitates mounting of the insert within at least one large ball bearing. The upper and lower ball bearings 33*a*, 33*b* may have an inner diameter of at least 80 mm, such as at least 120 mm.

Further, as seen in FIG. 4, the insert 1 is positioned within rotatable member 31 such that the imaginary apex 18 of the lowermost separation disc is positioned axially at or below at least one bearing plane of the upper and lower ball bearings 33*a*, 33*b*.

Moreover, the separation insert is mounted within the separator 1 such that the axial lower part 5 of the insert 1 is positioned axially below the supporting means, i.e. the upper and lower bearings 33*a*, 33*b*. The rotor casing 2 is in this example arranged to be solely externally supported by the rotatable member 31. The separation insert 1 is further mounted within the separator 100 to allow easy access to the inlet and outlets at the top and bottom of the insert 1.

Figure 5:
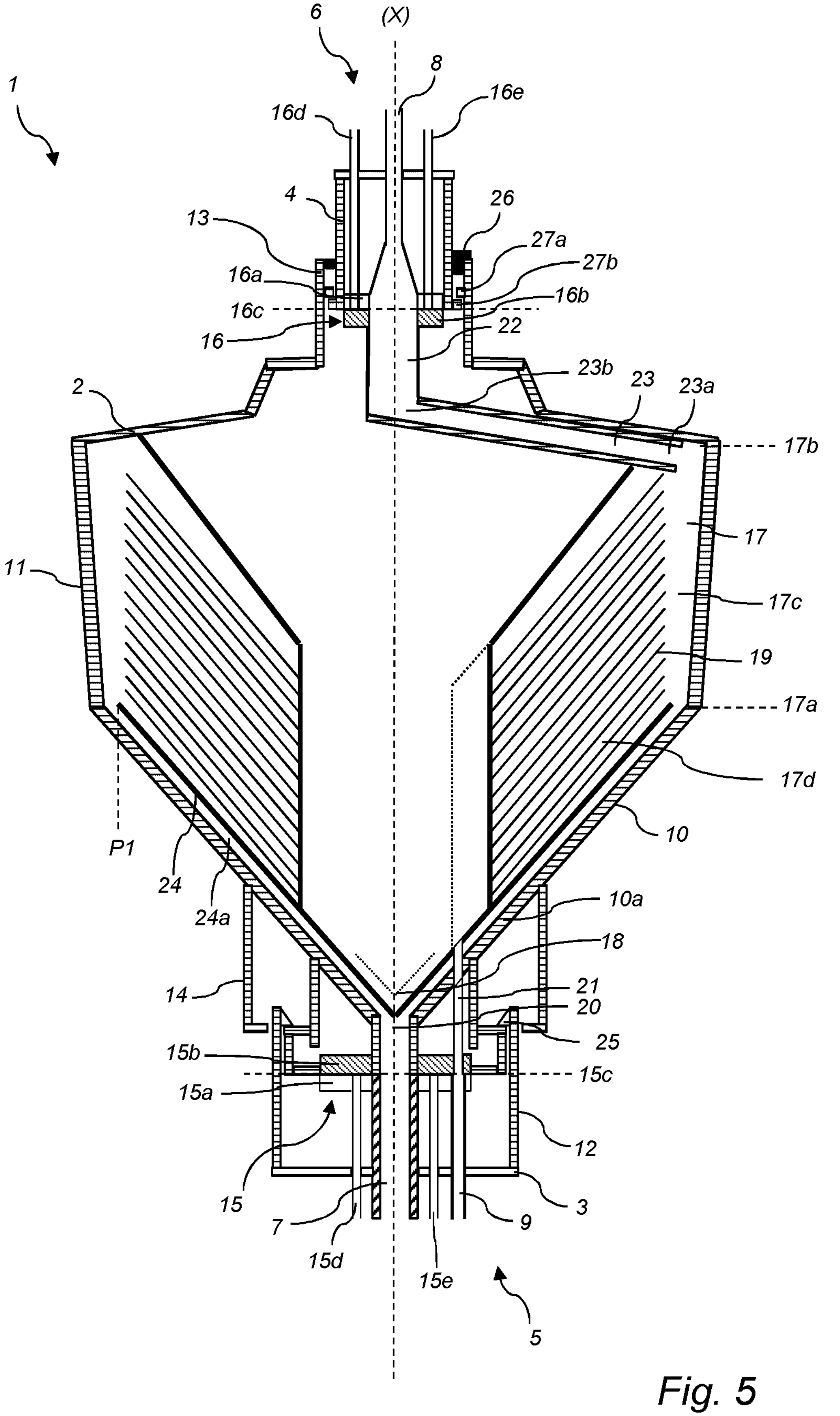
FIG. 5 is schematic section view of the exchangeable separation insert as shown in FIG. 3.

FIG. 5 shows a schematic illustration of cross-section of an embodiment of exchangeable separation insert 1 of the present disclosure. The insert 1 comprises a rotor casing 2 arranged to rotate around rotational axis (X) and arranged between a first, lower stationary portion 3 and a second, upper stationary portion 4. The first stationary portion 3 is thus arranged at the lower axial end 5 of the insert, whereas the second stationary portion 4 is arranged at the upper axial end 6 of the insert 1.

The feed inlet 20 is in this example arranged at the axial lower end 5, and the feed is supplied via a stationary inlet conduit 7 arranged in the first stationary portion 3. The stationary inlet conduit 7 may comprise a tubing, such as a plastic tubing. The stationary inlet conduit 7 is arranged at the rotational axis (X) so that the material to be separated is supplied at the rotational centre. The feed inlet 20 is for receiving the fluid mixture to be separated.

The feed inlet 20 is in this embodiment arranged at the apex of an inlet cone 10*a*, which on the outside of the insert 1 also forms the first frustoconical outer surface 10. There is further a distributor 24 arranged in the feed inlet for distributing the fluid mixture from the inlet 24 to the separation space 17.

The separation space 17 comprises an outer heavy phase collection space 17*c* that extends axially from a first, lower axial position 17*a* to a second, upper axial position 17*b*. The separation space further comprises a radially inner space formed by the interspaces between the separation discs of the stack 19.

The distributor 24 has in this embodiment a conical outer surface with the apex at the rotational axis (X) and pointing toward the lower end 5 of the insert 1. The outer surface of the distributor 24 has the same conical angle as the inlet cone

10*a*. There is further a plurality of distributing channels 24*a* extending along the outer surface for guiding the fluid mixture to be separated continuously axially upwards from an axially lower position at the inlet to an axially upper position separation space 17. This axially upper position is substantially the same as the first, lower axial position 17*a* of the heavy phase collection space 17*c* of the separation space 17. The distribution channels 24*a* may for example have a straight shape or a curved shape, and thus extend between the outer surface of the distributor 24 and the inlet cone 24*a*. The distribution channels 24 may be diverging from an axial lower position to an axial upper position. Furthermore, the distribution channels 24 may be in the form of tubes extending from an axial lower position to an axial upper position.

There is further a stack 19 of frustoconical separation discs arranged coaxially in the separation space 17. The separation discs in the stack 19 are arranged with the imaginary apex pointing to the axially lower end 5 of the separation insert, i.e. towards the inlet 20. The imaginary apex 18 of the lowermost separation disc in the stack 19 may be arranged at a distance that is less than 10 cm from the first stationary portion 3 in the axial lower end 5 of the insert 1. The stack 19 may comprise at least 20 separation discs, such as at least 40 separation discs, such as at least 50 separation discs, such as at least 100 separation discs, such as at least 150 separation discs. For clarity reasons, only a few discs are shown in FIG. 5. In this example, the stack 19 of separation discs is arranged on top of the distributor 24, and the conical outer surface of the distributor 24 may thus have the same angle relative the rotational axis (X) as the conical portion of the frustoconical separation discs. The conical shape of the distributor 24 has a diameter that is about the same or larger than the outer diameter of the separation discs in the stack 19. Thus, the distribution channels 24*a* may thus be arranged to guide the fluid mixture to be separated to an axially position 17*a* in the separation space 17 that is at a radial position $P_1$ that is outside the radial position of the outer circumference of the frustoconical separation discs in the stack 19.

The heavy phase collection space 17*c* of the separation space 17 has in this embodiment an inner diameter that continuously increases from the first, lower axial position 17*a* to the second, upper axial position 17*b*. There is further an outlet conduit 23 for transporting a separated heavy phase from the separation space 17. This conduit 23 extends from a radially outer position of the separation space 17 to the heavy phase outlet 22. In this example, the conduit is in the form of a single pipe extending from a central position radially out into the separation space 17. However, there may be at least two such outlet conduits 23, such as at least three, such as at least five, outlet conduits 23. The outlet conduit 23 has thus a conduit inlet 23*a* arranged at the radially outer position and a conduit outlet 23*b* at a radially inner position, and the outlet conduit 23 is arranged with an upward tilt from the conduit inlet 23*a* to the conduit outlet 23*b*. As an example, the outlet conduit may be tilted with an upward tilt of at least 2 degrees, such as at least five degrees, such as at least ten degrees, relative the radial plane.

The outlet conduit 23 is arranged at an axially upper position in the separation space 17, such that the outlet conduit inlet 23*a* is arranged for transporting separated heavy phase from the axially uppermost position 17*b* of the separation space 17. The outlet conduit 23 further extends radially out into the separation space 17 so that outlet conduit inlet 23*a* is arranged for transporting separated heavy phase from the periphery of the separation space 17, i.e. from the radially outermost position in the separation space at the inner surface of the separation space 17.

The conduit outlet 23*b* of the stationary outlet conduit 23 ends at the heavy phase outlet 22, which is connected to a stationary outlet conduit 8 arranged in the second, upper stationary portion 4. Separated heavy phase is thus discharged via the top, i.e. at the upper axial end 6, of the separation insert 1.

The use of a positive displacement pump downstream of the second liquid outlet 22 thus facilitates the discharge of separated heavy phase from the separation space via the outlet conduit 23.

Furthermore, separated liquid light phase, which has passed radially inwards in the separation space 17 through the stack of separation discs 19, is collected in the liquid light phase outlet 21 arranged at the axially lower end of the rotor casing 2. The liquid light phase outlet 21 is connected to a stationary outlet conduit 9 arranged in the first, lower stationary portion 3 of the insert 1. Thus, separated liquid light phase is discharged via the first, lower, axial end 5 of the exchangeable separation insert 1.

The stationary outlet conduit 9 arranged in the first stationary portion 3 and the stationary heavy phase conduit 8 arranged in the second stationary portion 4 may comprise tubing, such as plastic tubing.

There is lower rotatable seal 15, which separates the rotor casing 2 from the first stationary portion 3, arranged within lower seal housing 12 and an upper rotatable seal, which separates the rotor casing from the second stationary portion 4, arranged within upper seal housing 13. The first 15 and second 16 rotatable seals are hermetic seals, thus forming mechanically hermetically sealed inlet and outlets.

The lower rotatable seal 15 may be attached directly to the inlet cone 10*a* without any additional inlet pipe, i.e. the inlet may be formed at the apex of the inlet cone directly axially above the lower rotatable seal 15. Such an arrangement enables a firm attachment of the lower mechanical seal at a large diameter to minimize axial run-out.

The lower rotatable seal 15 seals and connects both the inlet 20 to the stationary inlet conduit 7 and seals and connects the liquid light phase outlet 21 to the stationary liquid light phase conduit 9. The lower rotatable 15 seal thus forms a concentric double mechanical seal, which allows for easy assembly with few parts. The lower rotatable seal 15 comprises a stationary part 15*a* arranged in the first stationary portion 3 of the insert 1 and a rotatable part 15*b* arranged in the axially lower portion of the rotor casing 2. The rotatable part 15*b* is in this embodiment a rotatable sealing ring arranged in the rotor casing 2 and the stationary part 15*a* is a stationary sealing ring arranged in the first stationary portion 3 of the insert 1. There are further means (not shown), such as at least one spring, for bringing the rotatable sealing ring and the stationary sealing ring into engagement with each other, thereby forming at least one sealing interface 15*c* between the rings. The formed sealing interface extends substantially in parallel with the radial plane with respect to the axis of rotation (X). This sealing interface 15*c* thus forms the border or interface between the rotor casing 2 and the first stationary portion 3 of the insert 1. There are further connections 15*d* and 15*e* arranged in the first stationary portion 3 for supplying a liquid, such as a cooling liquid, buffer liquid or barrier liquid, to the lower rotatable seal 15. This liquid may be supplied to the interface 15*c* between the sealing rings.

In analogy, the upper rotatable seal 16 seals and connects the heavy phase outlet 22 to the stationary outlet conduit 8. The upper mechanical seal may also be a concentric double mechanical seal. The upper rotatable seal 16 comprises a stationary part 16*a* arranged in the second stationary portion 4 of the insert 1 and a rotatable part 16*b* arranged in the axially upper portion of the rotor casing 2. The rotatable part 16*b* is in this embodiment a rotatable sealing ring arranged in the rotor casing 2 and the stationary part 16*a* is a stationary sealing ring arranged in the second stationary portion 4 of the insert 1. There are further means (not shown), such as at least one spring, for bringing the rotatable sealing ring and the stationary sealing ring into engagement with each other, thereby forming at least one sealing interface 16*c* between the rings. The formed sealing interface 16*c* extends substantially in parallel with the radial plane with respect to the axis of rotation (X). This sealing interface 16*c* thus forms the border or interface between the rotor casing 2 and the second stationary portion 4 of the insert 1. There are further connections 16*d* and 16*e* arranged in the second stationary portion 4 for supplying a liquid, such as a cooling liquid, buffer liquid or barrier liquid, to the upper rotatable seal 16. This liquid may be supplied to the interface 16*c* between the sealing rings.

Furthermore, FIG. 5 shows the exchangeable separation insert 1 in a transport mode. In order to secure the first stationary portion 3 to the rotor casing 2 during transport, there is a lower securing means 25 in the form of a snap fit that axially secures the lower rotatable seal 15 to the cylindrical portion 14 of rotor casing 2. Upon mounting the exchangeable insert 1 in a rotating assembly, the snap fit 25 may be released such that the rotor casing 2 becomes rotatable around axis (X) at the lower rotatable seal.

Moreover, during transport, there is an upper securing means 27*a,b* that secures the position of the second stationary portion 4 relative the rotor casing 2. The upper securing means is in the form of an engagement member 27*a* arranged on the rotor casing 2 that engages with an engagement member 27*b* on the second stationary portion 4, thereby securing the axial position of the second stationary portion 4. Further, there is a sleeve member 26 arranged in a transport or setup position in sealing abutment with the rotor casing 2 and the second stationary portion 4. The sleeve member 26 is further resilient and may be in the form of a rubber sleeve. The sleeve member is removable from the transport or setup position for permitting the rotor casing 2 to rotate in relation to the second stationary portion 4. Thus, the sleeve member 26 seals radially against the rotor casing 2 and radially against the second stationary portion 4 in the setup or transport position. Upon mounting the exchangeable insert 1 in a rotating assembly, the sleeve member may be removed and an axial space between engagement members 27*a* and 27*b* may be created in order to allow rotation of the rotor casing 2 relative the second stationary portion 4.

The lower and upper rotatable seals 15,16 are mechanical seals, hermetically sealing the inlet and the two outlets.

During operation, the exchangeable separation insert 1, inserted into a rotatable member 31, is brought into rotation around rotational axis (X). Liquid mixture to be separated is supplied via stationary inlet conduit 7 to the inlet 20 of the insert, and is then guided by the guiding channels 24 of the distributor 24 to the separation space 17. Thus, the liquid mixture to be separated is guided solely along an upwards path from the inlet conduit 7 to the separation space 17. Due to a density difference the liquid mixture is separated into a liquid light phase and a liquid heavy phase. This separation is facilitated by the interspaces between the separation discs of the stack 19 fitted in the separation space 17. The separated liquid heavy phase is collected from the periphery of the separation space 17 by outlet conduit 22 and is forced out via the heavy phase outlet 22 arranged at the rotational axis (X) to the stationary heavy phase outlet conduit 8. Separated liquid light phase is forced radially inwards through the stack 19 of separation discs and led via the liquid light phase outlet 21 out to the stationary light phase conduit 9.

Consequently, in this embodiment, the feed is supplied via the lower axial end 5, the separated light phase is discharged via the lower axial end 5, whereas the separated heavy phase is discharged via the upper axial end 6.

Further due to the arrangement of the inlet 20, distributor 24, stack 19 of separation discs and the outlet conduit 23 as disclosed above, the exchangeable separation insert 1 I is de-aerated automatically, i.e. the presence of air-pockets is eliminated or decreased so that any air present within the rotor casing is forced to travel unhindered upwards and out via the heavy phase outlet. Thus, at stand-still, there are no air pockets, and if the insert 1 is filled up through the feed inlet all air may be vented out through the heavy phase outlet 22. This also facilitates filling the separation insert 1 at standstill and start rotating the rotor casing when liquid mixture to be separated or buffer fluid for the liquid mixture is present within the insert 1.

As also seen in FIG. 5, the exchangeable separation insert 1 has a compact design. As an example, the axial distance between the imaginary apex 18 of the lowermost separation disc in the stack 19 may be less than 10 cm, such as less than 5 cm, from the first stationary portion 3, i.e. less than 10 cm, such as less than 5 cm, from the sealing interface 15*c* of the lower rotatable seal 15.

Further, the rotatable part of the first rotatable seal may be arranged directly onto the axially lower portion of the rotor casing.

The positive displacement pump may also be used in a centrifugal separator in which the rotatable assembly is not a single use insert. In embodiments, the rotatable assembly comprises a spindle arranged to rotate coaxially with the rotor casing and the spindle may rotatably supported by the stationary frame via at least one bearing.

Thus, the rotor casing may be arranged at an end of a rotatable spindle, and this spindle may be supported in the frame by at least one bearing device, such as by at least one ball-bearing.

As an example, said spindle may comprise a central duct arranged around the axis of rotation (X) and in fluid connection with said inlet, and wherein said first rotatable seal is sealing and connecting said central duct to said stationary inlet conduit.

Thus, the spindle may be a hollow spindle and may be used for supplying feed to the inlet. The spindle may further comprise an outer annular duct for discharging a separated liquid phase, such as the separated liquid light phase.

Figure 6:
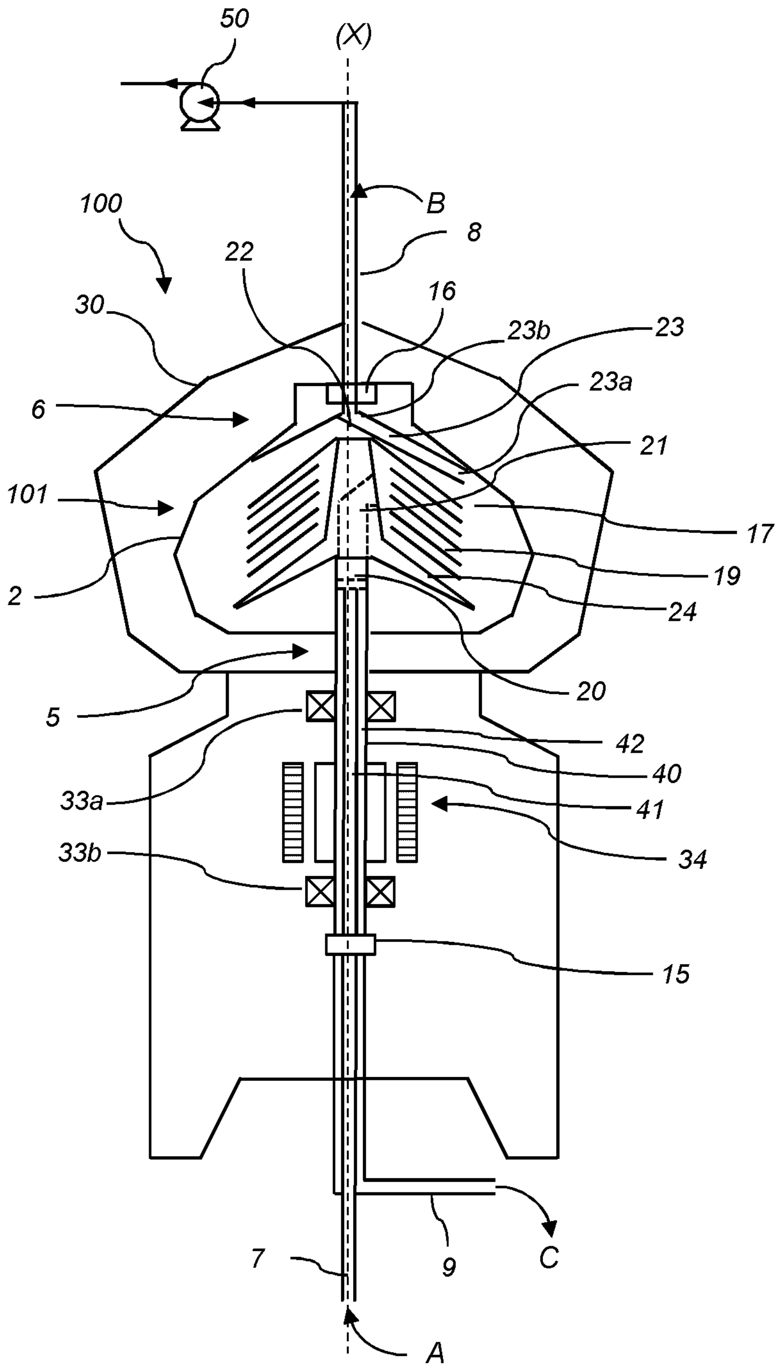
FIG. 6 is a schematic section of an embodiment of a centrifugal separator.

FIG. 6 shows in more detail a centrifugal separator 100 in which the rotatable assembly comprises a rotatable hollow spindle. The separator 100 comprises a frame 30, a hollow spindle 40, which is rotatably supported by the frame 30 in a bottom bearing 33*b* and a top bearing 33*a*, and a rotatable member 1 having a rotor casing 2. The rotor casing 2 is adjoined to the axially upper end of the spindle 40 to rotate together with the spindle 40 around the axis (X) of rotation. The rotor casing 2 encloses a separation space 17 in which a stack 19 of separation discs is arranged in order to achieve effective separation of a cell culture mixture that is processed. The separation discs of the stack 19 have a frustoconical shape with the imaginary apex pointing axially downwards and are examples of surface-enlarging inserts. The stack 19 is fitted centrally and coaxially with the rotor casing 2. In FIG. 6, only a few separation discs are shown. The stack 19 may for example contain above 100 separation discs, such as above 200 separation discs.

The rotor casing 2 has a mechanically hermetically sealed liquid outlet 21 for discharge of a separated liquid light phase, and a heavy phase outlet 22 for discharge of a phase of higher density than the separated liquid light phase. The liquid light phase may thus contain an extracellular biomolecule that has been expressed by the cells during fermentation and the separated heavy phase may be a separated cell phase.

There is a single outlet conduit 23 in the form of a pipe for transporting separated heavy phase from the separation space 17. This conduit 23 extends from a radially outer position of the separation space 17 to the heavy phase outlet 22. The conduit 23 has a conduit inlet 23*a* arranged at the radially outer position and a conduit outlet 23*b* arranged at a radially inner position. Further the outlet conduit 23 is arranged with an upward tilt relative the radial plane from the conduit inlet 23*a* to the conduit outlet 23*b*.

There is also a mechanically hermetically sealed inlet 20 for supply of the liquid mixture to be processed to said separation space 17 via the distributor 24. The inlet 20 is in this embodiment connected to central duct 41 extending through the spindle 40, which thus takes the form of a hollow, tubular member. Introducing the liquid mixture from the bottom provides a gentle acceleration of the feed. The spindle 40 is further connected to a stationary inlet pipe 7 at the bottom axial end of the separator 100 via a hermetic seal 15, such that the liquid mixture to be separated may be transported to the central duct 41, e.g. by means of a pump. The separated liquid light phase is in this embodiment discharged via an outer annular duct 42 in said spindle 40. Consequently, the separated liquid phase of lower density is discharged via the bottom of the separator 100.

A first mechanical hermetic seal 15 is arranged at the bottom end to seal the hollow spindle 40 to the stationary inlet pipe 7. The hermetic seal 50 is an annular seal that surrounds the bottom end of the spindle 40 and the stationary pipe 7. The first hermetic seal 15 is a concentric double seal that seals both the inlet 21 to the stationary inlet pipe 7 and the liquid light phase outlet 21 to a stationary outlet pipe 9. There is also a second mechanical hermetic seal 16 that seals the heavy phase outlet 22 at the top of the separator 100 to a stationary outlet pipe 8.

As seen in FIG. 6, the inlet 20, and the cell phase outlet 22 as well as the stationary outlet pipe 8 for discharging separated cell phase are all arranged around rotational axis (X) so that liquid mixture to be separated enters the rotor casing 2 at the rotational axis (X), as indicated by arrow "A", and the separated heavy phase is discharged at the rotational axis (X), as indicated by arrow "B". The discharged liquid light phase is discharged at the bottom end of the centrifugal separator 100, as illustrated by arrow "C".

The centrifugal separator 100 is further provided with a drive motor 34. This motor 34 may for example comprise a stationary element and a rotatable element, which rotatable element surrounds and is connected to the spindle 40 such that it transmits driving torque to the spindle 40 and hence to the rotor casing 2 during operation. The drive motor 34 may be an electric motor. Furthermore, the drive motor 34 may be connected to the spindle 40 by transmission means. The transmission means may be in the form of a worm gear which comprises a pinion and an element connected to the spindle 40 in order to receive driving torque. The transmission means may alternatively take the form of a propeller shaft, drive belts or the like, and the drive motor 34 may alternatively be connected directly to the spindle 40.

During operation of the separator in FIG. 6, rotatable assembly 101 and thus rotor casing 2 are caused to rotate by torque transmitted from the drive motor 34 to the spindle 40. Via the central duct 41 of the spindle 40, liquid mixture to be separated is brought into the separation space 17 via inlet 20. The inlet 20 and the stack 19 of separation discs are arranged so that the liquid mixture enters the separation space 19 at a radial position that is at, to or radially outside, the outer radius of the stack 19 of separation discs.

However, the distributor 24 may also be arranged to supply the liquid or fluid to be separated to the separation space at a radial position that is within the stack of separation discs, e.g. by axial distribution openings in the distributor and/or the stack of separation discs. Such openings may form axial distribution channels within the stack.

In the hermetic type of inlet 20, the acceleration of the liquid material is initiated at a small radius and is gradually increased while the liquid leaves the inlet and enters the separation space 17. The separation space 17 is intended to be completely filled with liquid during operation. In principle, this means that preferably no air or free liquid surfaces is meant to be present within the rotor casing 2. However, liquid mixture may be introduced when the rotor is already running at its operational speed or at standstill. Liquid mixture, such as a cell culture, may thus be continuously introduced into the rotor casing 2.

Due to a density difference, the liquid mixture is separated into a liquid light phase and a phase of higher density (heavy phase). This separation is facilitated by the interspaces between the separation discs of the stack 19 fitted in the separation space 17. The separated heavy phase is collected from the periphery of the separation space 17 by conduit 23 and forced out through outlet 22 arranged at the rotational axis (X), whereas separated liquid light phase is forced radially inwards through the stack 19 and then led out through the annular outer duct 42 in the spindle 40.

In the above the inventive concept has mainly been described with reference to a limited number of examples. However, as is readily appreciated by a person skilled in the art, other examples than the ones disclosed above are equally possible within the scope of the inventive concept, as defined by the appended claims.

The invention claimed is:

1. A centrifugal separator for separation of a liquid mixture comprising:

a stationary frame, a rotatable assembly and a drive unit for rotating the rotatable assembly relative the frame around an axis of rotation, wherein the rotatable assembly comprises a rotor casing enclosing a separation space in which a stack of separation discs is arranged to rotate around a vertical axis of rotation, and further comprises an exchangeable separation insert and a rotatable member, said exchangeable separation insert comprising said rotor casing and being supported by said rotatable member, said rotor casing further comprising:

a mechanically hermetically sealed inlet for supply of said liquid mixture to said separation space; and a first liquid outlet that is mechanically hermetically sealed and arranged for discharge of a separated liquid phase and a second liquid outlet that is mechanically hermetically sealed and arranged for discharge of a separated heavy phase, said heavy phase having a density that is higher than said liquid phase;

at least one second positive displacement pump arranged downstream of said second liquid outlet for transporting the separated heavy phase from said separation space; and at least one first positive displacement pump arranged downstream of said first liquid outlet for transporting the separated liquid phase from said separation space, wherein each of said at least one first positive displacement pump and said at least one second positive displacement pump is a peristaltic pump, and wherein the centrifugal separator is configured such that supply of the liquid mixture to the separation space is solely driven by a suction force generated by at least one of said at least one first positive displacement pump and said at least one second positive displacement pump.

2. The centrifugal separator according to claim 1, wherein the at least one second positive displacement pump arranged downstream of said second liquid outlet is configured for stopping the flow of separated heavy phase when not in operation.

3. The centrifugal separator according to claim 2, wherein the centrifugal separator is free of any valves between the second liquid outlet and the at least one second positive displacement pump arranged downstream of said second liquid outlet.

4. The centrifugal separator according to claim 1, wherein each of the at least one first positive displacement pump and the at least one second positive displacement pump is configured for providing a suction force and/or a counter pressure.

5. The centrifugal separator according to claim 1, wherein the centrifugal separator further comprises at least one pressure sensor arranged downstream of said second liquid outlet and a regulating valve arranged downstream of said first liquid outlet, and wherein said valve is configured to operate based on data generated by said pressure sensor.

6. The centrifugal separator according to claim 1, wherein the centrifugal separator further comprises at least one pressure sensor arranged downstream of said second liquid outlet, and wherein the at least one second positive displacement pump arranged downstream of said second liquid outlet is configured to operate based on data generated by said pressure sensor.

7. The centrifugal separator according to claim 1, wherein the centrifugal separator is free of any valves between the first liquid outlet and the at least one first positive displacement pump arranged downstream of said first liquid outlet.

8. The centrifugal separator according to claim 1, wherein the rotatable assembly further comprises at least one outlet conduit for transporting separated heavy phase from the separation space, said conduit extending from a radially outer position of said separation space to said second liquid outlet, said conduit having a conduit inlet arranged at the radially outer position and a conduit outlet arranged at a radially inner position.

9. The centrifugal separator according to claim 1, wherein said hermetically sealed inlet is arranged at a first axial end of said rotor casing and arranged so that the liquid mixture to be separated enters said rotor casing at the rotational axis, and wherein said second liquid outlet is arranged at a second axial end of said rotor casing opposite said first end and arranged so that said separated heavy phase is discharged at the rotational axis.

10. The centrifugal separator according to claim 1, wherein the centrifugal separator further comprises a first rotatable seal for sealing and connecting said inlet to a stationary inlet conduit, wherein at least a part of said stationary inlet conduit is arranged around the rotational axis.

11. The centrifugal separator according to claim 1, further comprising a second rotatable seal for sealing and connecting said second liquid outlet to a stationary outlet conduit arranged around the rotational axis, and wherein said at least one second positive displacement pump is configured for providing a flow of separated heavy phase in said stationary outlet conduit.

12. The centrifugal separator according to claim 1, wherein the exchangeable insert is a disposable insert adapted for single use.

13. A method for separating a liquid mixture comprising the steps of:

a) providing the centrifugal separator according to claim 1;

b) supplying said liquid mixture to be separated to said inlet; and c) discharging a separated heavy phase via said second mechanically hermetically sealed liquid outlet and a liquid phase via said first hermetically sealed liquid outlet, wherein the step b) of supplying the liquid mixture to be separated is at least partly performed by applying a suction force and/or a counter pressure with said at least one second positive displacement pump arranged downstream of said second liquid outlet and/or said at least one first positive displacement pump arranged downstream of said first liquid outlet.

14. The method according to claim 13, wherein step b) of supplying the liquid mixture to be separated is solely performed by applying a pressure with said at least one second positive displacement pump arranged downstream of said second liquid outlet and/or said at least one first positive displacement pump arranged downstream of said first liquid outlet.

15. The centrifugal separator according to claim 2, wherein each of the at least one first positive displacement pump and the at least one second positive displacement pump is configured for providing a suction force and/or a counter pressure.

16. The centrifugal separator according to claim 3, wherein each of the at least one first positive displacement pump and the at least one second positive displacement pump is configured for providing a suction force and/or a counter pressure.

17. The centrifugal separator according to claim 1, wherein the peristaltic pump comprises a flexible tube connected to a tubing or pipe through which the separated heavy phase is discharged and a rotor with a number of elements arranged for compressing the flexible tube upon rotation.

18. The centrifugal separator according to claim 1, wherein the rotor casing includes an axially upper end and an axially lower end, the separation space is defined by a frustoconical portion with a peripheral surface and an imaginary apex pointing toward the axially lower end of the rotor casing, and includes a heavy phase collection space extending from a lower axial position of the peripheral surface to an upper axial position of the peripheral surface, an inner diameter of the heavy phase collection space increases continuously from the lower axial position to the upper axial position, and a radially outermost circumference of the entire stack of separation discs is positioned between the lower axial position and the upper axial position.

* * * * *